June 7, 1932.　　　　H. NEWMAN　　　　1,861,508
SAW GAUGE
Filed Aug. 6, 1929
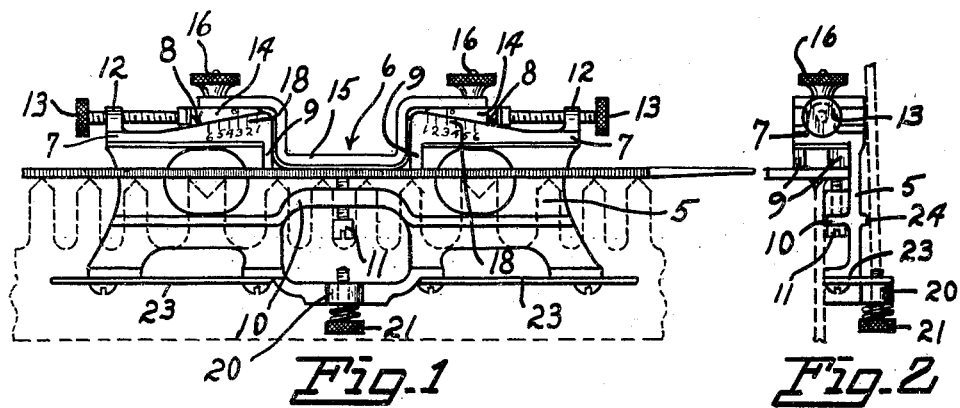
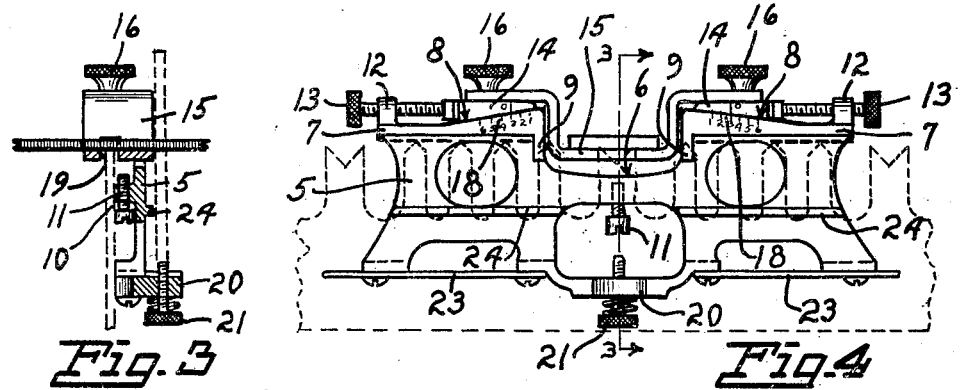
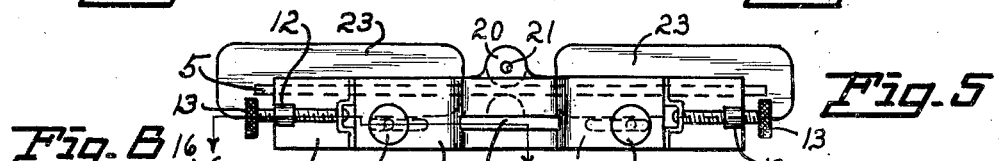
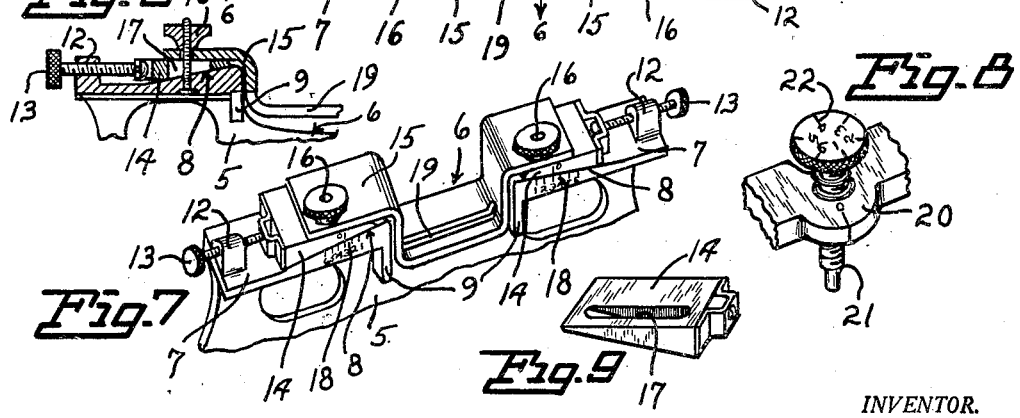
INVENTOR.
Herman Newman
BY Glenn L. Fish
ATTORNEYS.

Patented June 7, 1932

1,861,508

UNITED STATES PATENT OFFICE

HERMAN NEWMAN, OF GARWOOD, IDAHO

SAW GAUGE

Application filed August 6, 1929. Serial No. 383,898.

My invention relates to saw gauges and certain objects of the invention are to provide a gauge having adjustable means whereby saw teeth may be evenly dressed and the raker teeth may be filed or trimmed to any desired lengths. Further objects are to provide certain adjustable members together with guide means whereby the device may be attached to a saw and the raker teeth of the saw may be filed to conform with predetermined settings of the gauge.

With the above and other objects in view which will appear as the description proceeds, the invention consists of the novel construction, adaptation, combination and arrangement of parts hereinafter described and claimed. These objects are accomplished by devices illustrated in the accompanying drawing; wherein:—

Figure 1 is a view in side elevation of the saw gauge showing the file positioned for evenly dressing the saw teeth;

Fig. 2 is a view in end elevation of the same;

Fig. 3 is a view in transverse vertical section taken substantially on a broken line 3—3 of Fig. 4;

Fig. 4 is a view in side elevation showing the gauge adjusted to position for trimming the rakers;

Fig. 5 is a top plan view of the device;

Fig. 6 is a view in vertical section of a fragmentary portion of the device showing the means for adjusting the gauge yoke;

Fig. 7 is a view in perspective of the upper portion of the device;

Fig. 8 is a detail view in perspective of the gauge screw that is used for gauging the length of the raker teeth; and Fig. 9 is a detail view in perspective showing one of the wedge shaped adjusting blocks.

Referring to the drawing throughout which like reference numerals designate like parts, the numeral 5 indicates the upright frame portion of the gauge as a whole. The upper central portion of said frame is cut away, as at 6, and corresponding top portions 7 at right angles with said upright portion are disposed on either side of the cut away portion as clearly shown in the drawing.

The corresponding top portions 7 slant upwardly to form inclined planes 8 whose ends extend downwardly at either side of the opening 6 to form depending fingers 9 that are of equal lengths and disposed at right angles with the upright frame portion 5. A rib 10 is formed on said upright frame and a screw 11 is centrally disposed therein for reasons hereinafter set forth.

The outer ends of the top portions 7 are provided with internally threaded lugs 12 that receive screws 13 whose inner ends are swiveled to wedges 14 that fit against the inclined planes 8. A case hardened yoke 15 has its central depressed portion fitting into the opening or cut away portion 6 of the frame and its flanged end portions fitting against the wedges 14. Thumb screws 16 pass through said end portions and through slots 17 in said wedges and are threaded into the inclined plane members.

By turning the screws 13 back or forth the wedges 14 moving on the inclined planes 8 will raise or lower the yoke 15 as will be understood. An index mark on said wedges may be brought to register with any of the graduations of a scale 18 on the sides of the inclined plane members for the purpose of determining the exact amount which the yoke is raised or lowered. A slot 19 is provided in the depressed portion of said yoke through which the teeth of a saw may project for reasons presently set forth. The top surface of the depressed portion of said yoke is in horizontal alignment with the underside of the portions 7 when said wedges are adjusted to a reading of "one" on said scale.

A lug 20 is formed on the lower and rear edge of the frame 5 disposed at right angles thereto and a thumb screw 21 is threaded upwardly through said lug. The head of said screw is graduated, as at 22 in Fig. 8, and said graduations may be brought into coincidence with an index mark on said lug by turning the screw. Base plates 23 are secured to the bottom edge of the frame 5 on either side of said lug with their upper surfaces in the same plane with the top of said lug. The end of said screw is in horizontal alignment with said base plates when the reading on the scale 22 is "one."

Referring to Figs. 2 and 3 of the drawing, a rib 24 is formed on the rear side of the frame 5 whose outer edge is in vertical alignment with the outer rear edges of the top portions 7 of said frame and in such position with respect to the screw 21 that when the side of a saw is placed against said outer edges it may impinge the top end of said screw as shown in dotted lines. On the inner side of the frame 5 the inner extension of the lug 20 is in vertical alignment with the inner edge of the rib 10 so that when the side of a saw is placed against said inner edges it may project upwardly between the fingers 9 and through the slot 19 of the yoke 15 as shown in dotted lines.

The first usage of my device consists in dressing the saw teeth evenly and this may be done, as shown in dotted lines in Figs. 1 and 2, by placing one side of a file aginst the lower ends of the fingers 9 and clamping the file in position by means of the screw 11. The device may then be placed against a saw as shown in dotted lines with the file engaging the saw teeth and then moved back and forth until the teeth are evenly dressed.

The lengths of the raker teeth may next be determined, which length may vary for woods of different texture. This may be done by inverting the saw or the gauge and placing the rear side of the gauge against the saw in such position that the teeth thereof will rest on the plates 23. The screw 21 is then placed in correlation with a raker tooth which has already been shortened to the desired length. Said screw is then turned until it engages said tooth and the reading on the scale 22 is noted which we will assume is three.

It will be understood that the scales 18 on the inclined plane members 8 agree with the scale 22 in so far that equal vertical increments of movement show corresponding readings on both scales. The gauge may now be adjusted for the third usage which consists in filing off the raker teeth to the desired lengths. This is done by loosening the screws 16 and manipulating the screws 13 until the scales 18 register the proper reading which has already been determined as three.

In the foregoing adjustment it will be found that the yoke 15 has been lowered so that when the device is placed against a saw with the undersides of the top portions 7 of the frame resting against the saw teeth, as shown in dotted lines in Figs. 3 and 4, said teeth will project above the depressed portion of said yoke. The device is therefore moved along the saw until each of the raker teeth project upwardly through the slot 19 in said yoke into the space 6 and said rakers are filed off one at a time even with the top of said yoke as will be understood.

Having thus described my invention, it being understood that minor changes may be resorted to in its construction without departing from its scope and spirit, what I claim and desire to secure by Letters Patent of the United States is:—

A saw gauge having in combination an upright frame with a central cut-away portion, said frame having inwardly and upwardly slanting top portions on either side of the cut away portion with equal depending fingers, a slotted yoke arranged to straddle the cut-away opening with its ends projecting over the slanting top frame portions, wedges interposed between the ends of the yoke and the slanting top frame portions, clamp means for the wedges, said wedges having corresponding index marks adapted to register with corresponding graduations on the sides of the slanting top frame portions, screws threadedly connected to the frame and having their ends swiveled to said wedges whereby the wedges are moved back and forth, aligned base plates secured to the bottom edges of the frame, said frame having a lug formed on its lower rear edge portion, a thumb screw threaded upwardly through said lug and having graduations adapted to register with an index mark on the lug, said graduations being arranged to show a corresponding reading with the graduations on the inclined frame portions when the upper end of said thumb screw is in horizontal alignment with said base plates and when at the same time the top surface of the depressed yoke portion is in horizontal alignment with the undersides of the slanting top frame portions.

In testimony whereof I affix my signature.

HERMAN NEWMAN.